Patented Oct. 8, 1935

2,016,532

UNITED STATES PATENT OFFICE 2,016,532

LUBRICANT MIXTURE

Victor R. Abrams, Brunswick, Ga., and Carroll A. Hochwalt, Oakwood, Ohio, assignors to Sulflo Corporation of America, Boston, Mass., a corporation of Georgia No Drawing. Application August 15, 1934, Serial No. 740,005

12 Claims. (Cl. 87—9)

This invention relates to lubricants; and more particularly relates to the use of carnauba wax for suspending lubricant particles in petroleum oil vehicles, although it is not limited thereto.

In the patent to V. R. Abrams No. 1,913,300, issued June 6, 1933, there is disclosed and claimed a freely flowing lubricant comprised of sulfur particles of greater than colloidal size (such as flowers of sulfur) suspended in a liquid vehicle by means of elastic gel particles. In connection with oil vehicles, specific mention is made of the use of soap-oil gel particles.

As is pointed out in said patent, a sulfur lubricant of this type possesses unusual properties as a cutting fluid and is also of great value under various other extreme-pressure and/or high-temperature conditions. This is due primarily to the non-colloidal sulfur particles, which give a lubricating effect not possible with sulfur in other forms; while the practical use of these particles is made convenient and in many cases feasible by the provision of means for stably suspending the particles in a freely flowing lubricant mixture.

An object of the present invention is to provide improved means for supporting sulfur particles in petroleum oil vehicles, whereby a greater usefulness of this type of lubricant is made possible.

A further object is to provide improved means for supporting in petroleum oil vehicles all types of lubricant and other particles insoluble therein, whereby freely flowing stable suspensions of graphite, talc, etc., can be obtained.

These and further objects and features of our invention will be made evident as the description progresses.

We have discovered that carnauba wax possesses many desirable features when used in conjunction with a petroleum oil vehicle and constitutes therewith a superior means of stably suspending particles distributed in the mineral oil. The general manner of incorporating the carnauba wax to secure this result is as folows:

Carnauba wax is dissolved in the selected petroleum oil by mixing and heating together; following which the solution is cooled, with a resulting formation of gel. Agitation causes the gel to be broken up into small particles, surrounded by oil, and these particles will then stably hold other particles which are distributed throughout the mass. Particles of greater density will be prevented from settling and particles of less density will be prevented from rising.

These gel particles are elastic in nature and resist deformation and displacement in a manner such that a small force will merely deflect them without producing continuous motion, and a force in excess of a minimum which depends upon the materials and conditions is required to produce continued motion of any object present in a mass of the particles. The result is that the gel particles and other particles present are prevented from moving through the mass, the force of gravity or buoyancy being less than the minimum force required for continuous motion. In this manner even such dense particles as those of finely divided lead can be prevented from settling out.

In order to produce the above effect, the gel particles must be sufficiently close together so that they cannot be merely carried through the liquid vehicle without influencing each other, and this minimum requirement may be readily determined by experiment in any desired case.

The carnauba-wax petroleum-oil mixture capable of sustaining particles may be broadly characterized as a mobile discontinuous gelatinous mass composed of particles of elastic wax-oil gel substantially in contact with each other and having the interspaces containing oil, the particles to be suspended being distributed in or between the gel particles and prevented from moving thereby.

The term "gelcosity" is used to designate this property of mobile discontinuous gelatinous masses, and the degree of force required to produce continuous motion within such gel masses.

The possession of gelcosity and the relative gelcosity of mobile media may be easily determined by using a light metal plate or vane suspended in a vertical plane by a fine wire or fibre secured to a fixed support. The wire should be surrounded by a fixed tube or sleeve to prevent sway. The vane is placed in the medium and the latter rotated a certain amount, as by turning the receptacle, whereupon the vane will swing about its axis and then return toward its initial rest position due to the restoring force exerted by the wire. If the medium possesses the property of gelcosity, the vane will not return completely but will come to rest in a displaced position. The greater the displacement the greater the force needed to cause continuous movement or flow within the medium and hence the greater the gelcosity. If the mobile medium is continuous, it can have no gelcosity and the vane will slowly return to the initial position even though the medium is highly viscous; while a medium may have a high gelcosity and cause a large displacement even though the medium is quite freely flowing in consistency.

This characteristic of mobile discontinuous gelatinous masses is not possessed by mobile continuous gelatinous masses, that is, gelatinous masses in which no discrete gel particles exist. In the latter case an infinitely small force will produce flow and no gelcosity will be indicated by the above test, just as in the case of non-gelatinous liquids of high or low viscosity. An example of a mobile continuous gelatinous mass is a solution of raw rubber dissolved in a petroleum oil. This possesses the characteristics of elasticity, stringiness and may have a high viscosity, but an infinitely small force will produce flow and hence no gelcosity will be exhibited. A gelatinous mass which has "set", forming a solid jelly, is also a continuous gelatinous mass, but of course is not mobile and exhibits the overall characteristics of a solid until broken up to form a discontinuous mass, and thus obviously does not possess the characteristics of a mobile discontinuous gelatinous mass containing discrete gel particles.

Unless sufficient gel material is present to exist in equilibrium with the liquid phase, a serum layer will form due to contraction of the gel particles. This may be due to either or both of the following effects: The gel particles will tend to settle until substantially in contact, further settling then being prevented by the gelcosity property, leaving a supernatant serum layer of the liquid; unless the particles are originally present in such concentration as to be substantially in contact. Even when substantially in contact, the individual gel particles will tend to contract, with a resulting exuding of the liquid contained therein, until an equilibrium is established, if they have originally taken up too much liquid. This latter effect is known as syneresis.

Hence if a mixture is desired which will remain substantially uniform on standing, sufficient carnauba wax should be employed initially; or as an alternative the mixture may be allowed to stand until substantial equilibrium has resulted, and the serum layer then drawn off. The amount of wax to be used can easily be determined by trial and will vary somewhat, depending upon the particular procedure employed.

The formation of a serum layer does not mean that the particles are not stably suspended, but that an excess of liquid is present. In other words, there is no settling to a compact mass or layer on the bottom of the receptacle, the lubricant or other particles remaining distributed throughout the gel mass and stably suspended therein. Gentle agitation or stirring readily causes the serum layer to redistribute itself throughout the gelatinous mass to reform a completely uniform mixture.

The greater the percentage of carnauba wax employed with the petroleum oil vehicle the greater the gelcosity. We find that the phenomenon of gelcosity exists when as little as 1% of the wax is used, and that 2% of carnauba wax provides a gelatinous mass of practical utility for supporting sulfur particles, but 3% is preferred in order to provide some leeway. In the preparation of commercial lubricants it is advantageous to use a greater amount of wax in order to provide a concentrated product for manufacture and sale which may subsequently be diluted with oil by the user.

A plasticizer in the nature of a wax solvent may be added to change the solubility of the wax and thus modify the results.

All of the various grades of carnauba wax may be used to produce the improved results characteristic of this wax—such as North County, pale, dark and chalky.

The carnauba wax type of product retains its property of gelcosity up to about 50°–55° C., depending on the concentration and specific ingredients, and thus permits stable suspension of particles under ordinary storage, shipment, idling, low temperature use, and other similar conditions. At higher temperatures the product is usually being agitated and circulated sufficiently to prevent undesirable settling, for example when employed with sulfur particles as a cutting lubricant in machinery provided with a circulation pumping system for reuse, or as a lubricant for moving bearing parts. Cooling causes a return of the property of gelcosity and hence enables the particles to be stably suspended during idling of the lubricant.

No objectionable odor is produced by the use of carnauba wax; no objectionable foaming is caused; it is not sticky and thus does not gum up tool slides and bearings, etc., with which it comes in contact, which is particularly desirable when used in cutting lubricants employed in automatic machinery; it does not develop free corrosive fatty acids or other substances which affect polished surfaces; nor does it oxidize nor show instability to mechanical wear.

A valuable feature is that our carnauba wax type of lubricant mixture is not irritating to operators' hands and skin. It keeps the hands clean and free of clogged pores and thus inhibits infection from dirt and attendant germs. This is due to the fact that the gelatinous mass possesses a detergent action—like soap and water.

Waxes, soaps and other substances have been used in the past for the purpose of rendering mineral oils capable of holding various solid particles in suspension. However, all of these are open to objection on one or more grounds and it is this reason which led us to seek a better material and thus ultimately to make the present invention. During our development work a large number of materials not heretofore known for such use were also tried and discarded as not measuring up to what was desired.

The trouble with most waxes and soaps is that the gel particles formed therewith possess such low melting or dissolving points as to render their use impractical, notwithstanding that the soap or wax per se may be of rather high melting point. Many materials are not capable of imparting an adequate gelcosity to the oil mixture and some of the soaps and waxes do not form particle-sustaining masses at any temperature.

Some waxes and soaps, for example aluminum stearate, produce gel particles having a higher melting point than the carnauba type, but produce objectionable foaming when the product is circulated as a cutting lubricant in machine tools. The continued pumping, and flow over the tool, produces a malignant type of foam which progressively tends to selectively adsorb more and more of the soap or wax from the main body of the lubricant and ultimately causes the latter to lose its property of gelcosity.

Accordingly, the value of our invention will be appreciated by those skilled in the lubricant art and it will be evident that the desirable properties of carnauba wax render its use advantageous in many fields for stably suspending particles in petroleum vehicles.

The following examples illustrate various ways of preparing a freely flowing lubricant comprised of sulfur particles suspended by means of carnauba wax in a petroleum oil vehicle.

*Example I*

Melt and dissolve a portion of carnauba wax in 1½ times its weight of petroleum oil (for example a neutral oil having a flash-point of 350° F. and a viscosity of 100 seconds Saybolt at 100° F.), raising the temperature to about 120° C.; remove the heat, and while stirring add additional unheated oil until the wax content is reduced to 9%. Add 15% flowers of sulfur and force the mixture through a small orifice to finely divide and distribute the sulfur and gel particles present, so as to obtain a product which feels smooth and not grainy.

This lubricant may be stored and shipped without substantial serum layer formation, and is intended to be diluted with further oil by the user to obtain a cutting oil with 5% sulfur content.

Example II

Melt and dissolve 8% of carnauba wax in a petroleum oil at 80°–100° C., allow to cool to 50° C. with or without stirring (preferably without stirring), and then add 15% of flowers of sulfur, stir, and pass through an orifice. Less wax can be used with this method than in the preceding one, due to the heating of the wax in the presence of the full amount of oil.

This product is likewise intended to be diluted by the user to secure a 5% sulfur content lubricant.

Example III

Melt and dissolve 2½% of carnauba wax in a petroleum oil at 80°–100° C., allow to cool to below 50° without stirring until the gel sets, stir in 5% of flowers of sulfur, and pass through an orifice.

This illustrates the direct production of the final product to be employed by the user, and less wax is needed than in either of the preceding examples relative to the final quantity of oil present, due to heating of the wax with all of the oil to be used. However, such a product is more expensive to ship than the more concentrated forms.

In the claims it will be understood that the term "freely flowing" is used to distinguish from pastes and cakes, which cannot be readily poured or circulated through pipes, and from materials of such consistency as to be able to support non-colloidal particles distributed therein by virtue of the bulk viscosity alone. In this connection the distinction between viscosity and gelcosity, which has been pointed out in the foregoing description, should be borne in mind.

The term "petroleum oil" as used in the description and claims includes not only oil derived from petroleum but equivalent hydrocarbon and mineral oils.

Having disclosed several embodiments of our invention, and having discussed the nature of our invention for the assistance of others, but without any intent to be limited thereby, what we claim is as follows:

1. A cutting lubricant comprising a freely flowing discontinuous gelatinous mass composed of particles of carnauba-wax/petroleum-oil gel substantially in contact with each other and having the interspaces containing petroleum oil, and a sufficient amount of free sulfur particles of greater than colloidal size to function as a lubricating ingredient distributed between the gel particles and supported thereby.

2. A lubricant for use under extreme-pressure and/or high-temperature conditions comprising a petroleum oil vehicle gelled with a small amount of carnauba wax so as to be freely flowing and possessed of gelcosity, and powdered sulfur of greater than colloidal size distributed therein.

3. A lubricant comprised of a petroleum oil vehicle gelled with a small quantity of carnauba wax amounting to at least 1%, possessed of gelcosity and constituting a freely flowing discontinuous mass, and a small amount of sulfur particles to function as a lubricating ingredient distributed therein.

4. A lubricant comprised of a petroleum oil vehicle gelled with about 2–3% of carnauba wax, constituting a freely flowing discontinuous mass possessed of gelcosity, and about 5% of finely divided sulfur particles of greater than colloidal size distributed therethrough and stably suspended therein.

5. A lubricant base for dilution with petroleum oil to constitute a freely flowing cutting fluid containing stably suspended sulfur particles of greater than colloidal size, comprising a petroleum oil vehicle gelled with sufficient carnauba wax to constitute a discontinuous gelatinous mass which will retain gelcosity upon being diluted with a predetermined maximum amount of petroleum oil at a subsequent time, and sufficient finely divided sulfur of greater than colloidal size distributed therein to serve as a lubricating ingredient upon said dilution.

6. A lubricant comprised of a discontinuous gelatinous mass of carnauba-wax/petroleum-oil gel particles and particles of finely divided sulfur of greater than colloidal size distributed therein and stably suspended.

7. A lubricant comprised of a discontinuous gelatinous mass of carnauba-wax/petroleum-oil gel particles and lubricant particles of greater than colloidal size distributed therein and stably suspended.

8. A lubricant comprising a petroleum oil vehicle gelled with a small amount of carnauba wax so as to be freely flowing and possessed of gelcosity, and finely divided lubricant particles of greater than colloidal size distributed therein.

9. A lubricant comprising a freely flowing discontinuous gelatinous mass composed of particles of carnauba-wax/petroleum-oil gel substantially in contact with each other and having the interspaces containing petroleum oil, and a sufficient amount of lubricant particles of greater than colloidal size to function as a lubricating ingredient distributed between the gel particles and supported thereby.

10. A freely flowing medium capable of stably suspending particles of greater than colloidal size distributed therein, comprising a petroleum oil vehicle gelled with a small amount of carnauba wax, amounting to at least 1%, so as to contain wax-oil gel particles and possess the property of gelcosity.

11. A freely flowing medium capable of stably suspending particles of greater than colloidal size distributed therein, comprising a discontinuous gelatinous mass composed of particles of carnauba-wax/petroleum-oil gel substantially in contact with each other and having the interspaces containing petroleum oil.

12. A composition of matter comprising in combination a freely flowing suspending medium composed of a petroleum oil gelled with a small amount of carnauba wax, constituting a mobile discontinuous gel, and solid particles of greater than colloidal size distributed therethrough in an amount to be stably suspended, said solid particles being of a kind substantially insoluble in the mixture.

VICTOR R. ABRAMS.
CARROLL A. HOCHWALT.